INVENTOR
ROBERT H. SZABRAK
BY
Baldwin, Doran & Egan
ATTORNEYS

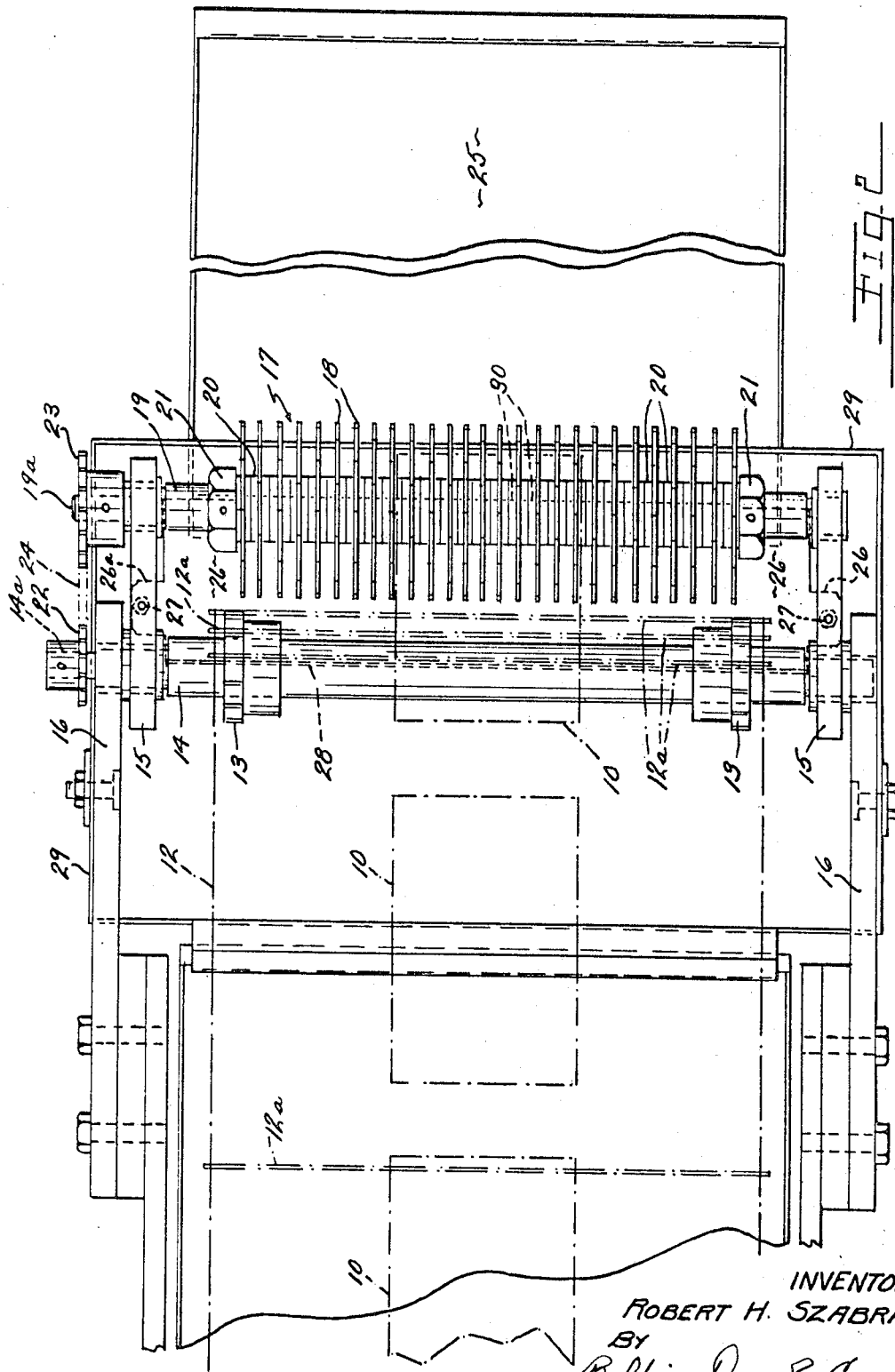

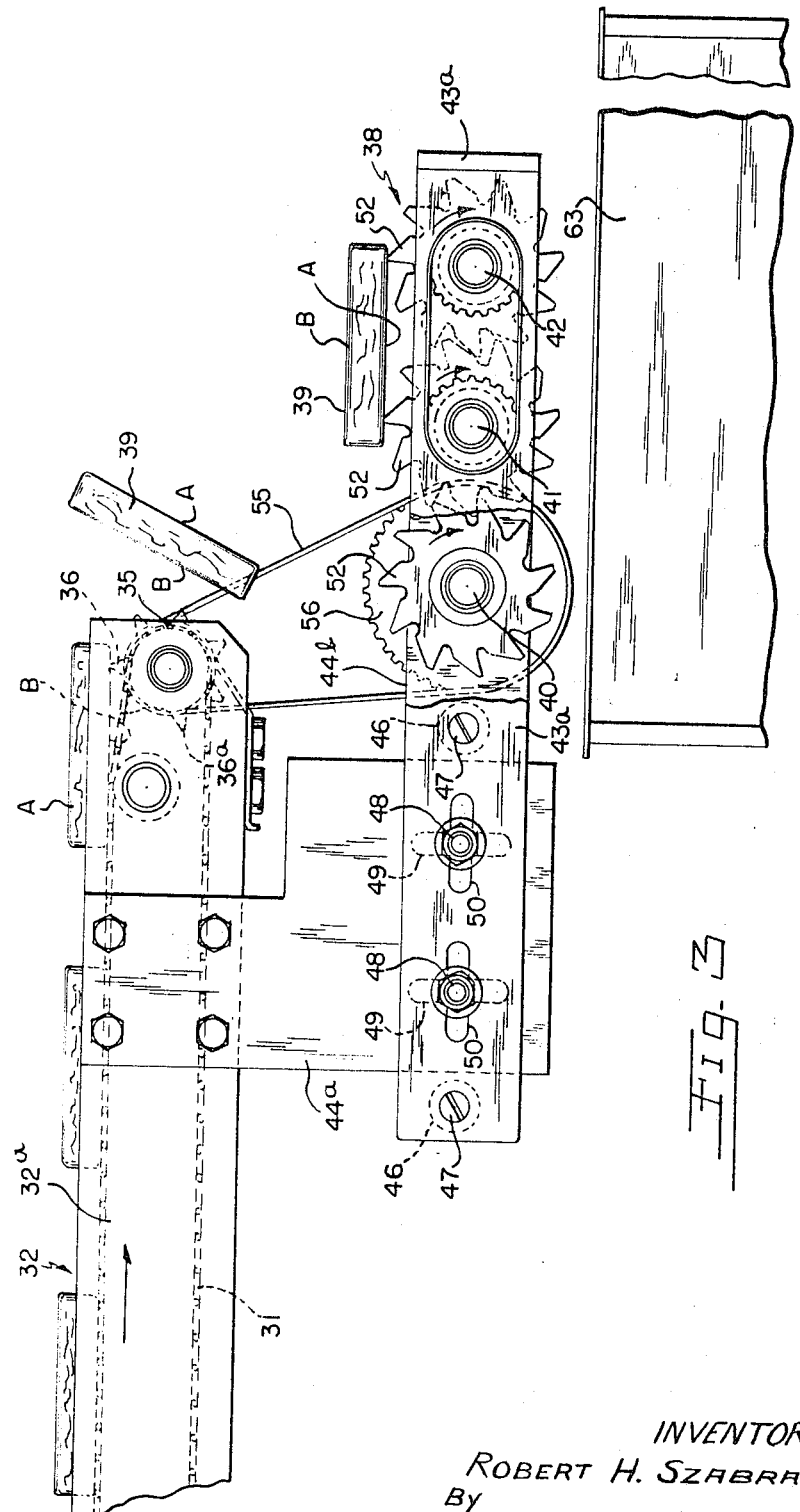

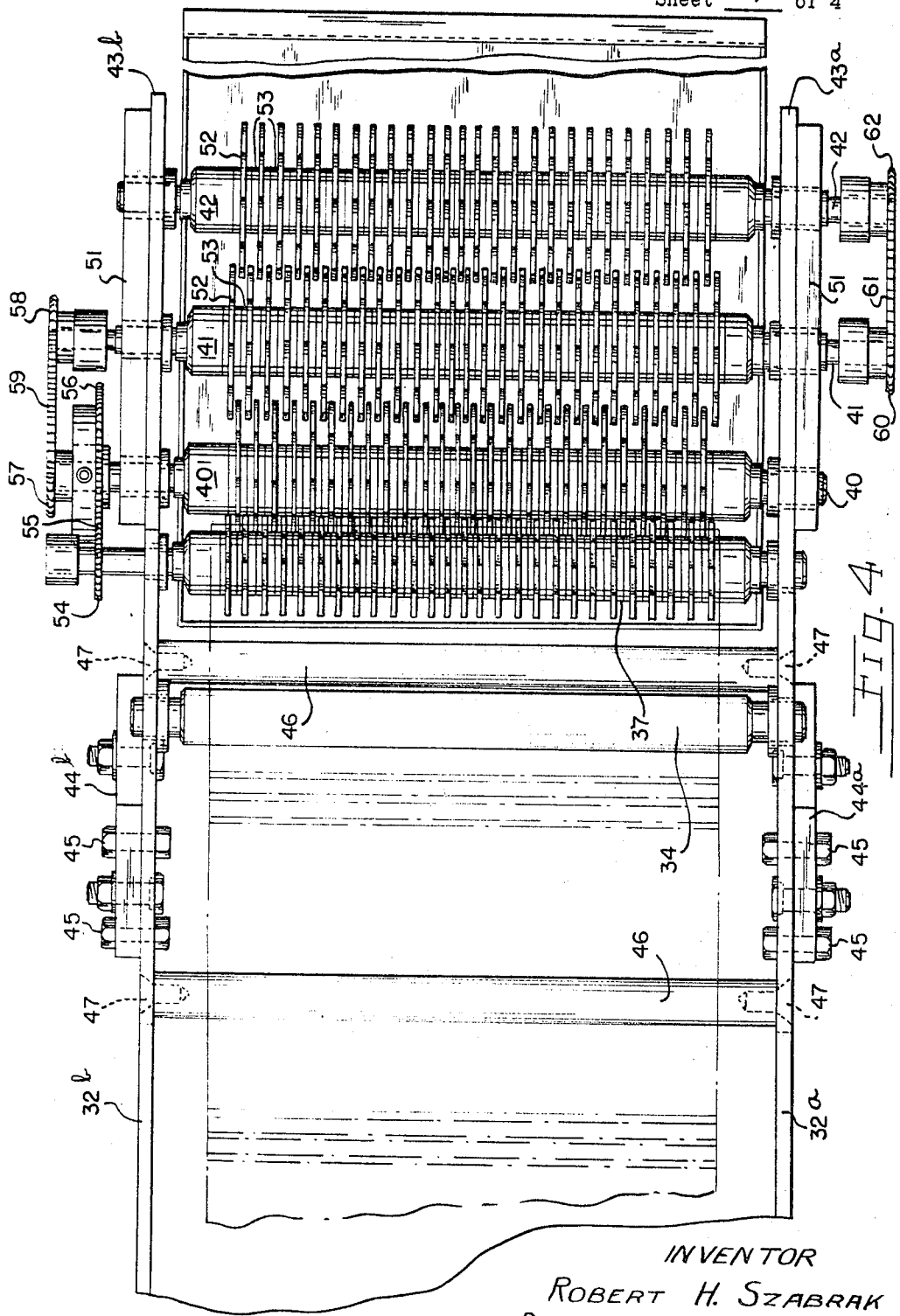

United States Patent Office 3,450,026
Patented June 17, 1969

3,450,026
CONVEYOR FOR BATTER-COATED FOOD PRODUCT
Robert H. Szabrak, Sandusky, Ohio, assignor to Sam Stein Associates, Inc., Sandusky, Ohio, a corporation of Ohio
Continuation-in-part of application Ser. No. 537,911, Mar. 28, 1966. This application Oct. 7, 1966, Ser. No. 585,181
Int. Cl. A47j 37/12
U.S. Cl. 99—407                                6 Claims

ABSTRACT OF THE DISCLOSURE

A batter-coated food product moving along an open wire mesh conveyor belt to the discharge end thereof is picked up by pointed members rotating in a path which is substantially tangent to the discharge run of the conveyor and moving in the same direction and at approximately the same speed so as to move the coated article off of the conveyor and drop it freely in a vertical fall downwardly into a hot bath of oil with a minimum disturbance of the coating of batter on the food product. In a modification, free fall of the article downwardly, as it leaves the pointed members, is sufficient to allow the article to turn over to fall onto a short conveyor touching the article at spaced points only. This gives additional opportunity for self-restoration of any disturbance of the coating originally on the bottom of the article.

---

Figure 1:
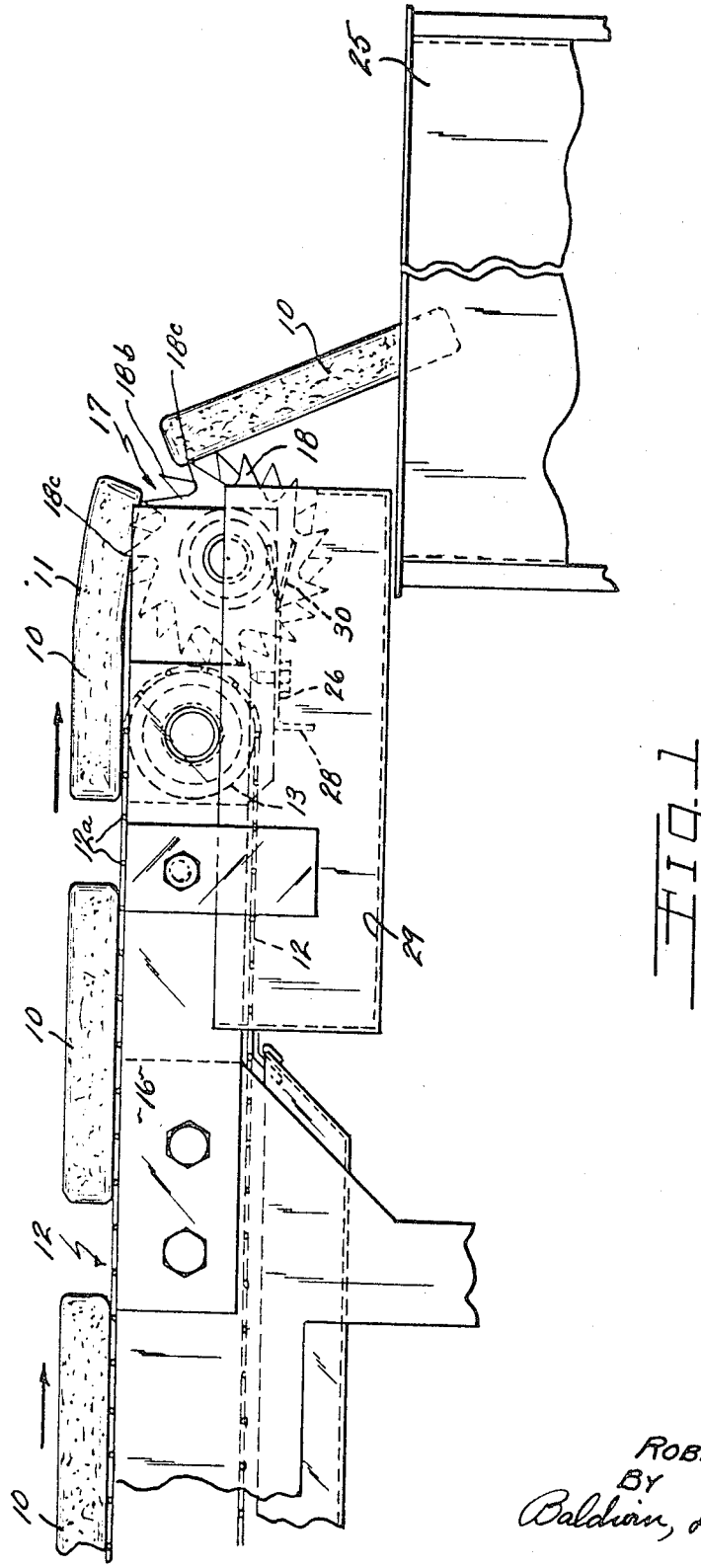

This application is a continuation-in-part of my application Ser. No. 537,911, filed Mar. 28, 1966, now abandoned, to Conveyor for Batter-Coated Food Product.

This invention relates to improvements in a conveyor for a batter-coated food product and more particularly for a novel means for transferring the coated food product from a horizontal run to a place of vertical drop for further processing of the coated food article.

One of the objects of the present invention is to provide transfer wheel means at the end of a horizontal conveyor, an essential feature of which is a plurality of pointed members extending radially outwardly of the transfer wheel means and terminating in a generally circumferential zone whose highest level is not substantially higher than a position approximately tangent with the top level of the conveyor belt, together with means for driving the wheel means so that its pointed ends move at a rate of speed approximating the speed of the conveyor so that a coated food article may be taken from the conveyor belt with only a slight disturbance of the coating of the food article by the pointed members of the transfer wheel means, after which the article is dropped vertically, as for instance into a hot fat cooker.

Other objects and advantages of the present invention will be apparent from the accompanying drawings and description and the essential features thereof will be set forth in the appended claims.

In the drawings,
FIG. 1 is a side elevational view of the coated food handling apparatus of this invention;
FIG. 2 is a top plan view of the same;
FIG. 3 is a side elevational view of a modification; while
FIG. 4 is a top plan view of the same.

The drawings illustrate the apparatus used in handling a coated food article 10 which might be a fish cake or a veal cutlet or the like and the coating of which as indicated at 11 would comprise a fairly thick batter. Batter coating machines are well known and one is intended for use at the left-hand end of FIGS. 1 and 2 but is not shown herein because it has no part in the present invention except for providing the coated article in the first place.

A conveyor belt 12 is provided having an upper run to carry the coated articles in the direction of the arrow shown in FIG. 1 between a batter coating machine and the transfer apparatus of this invention. A preferred form of this conveyor belt is an open mesh wire structure, a few wires of which are indicated in the drawings at 12a. At the discharge end, this conveyor passes over pulley means 13 rotatable by means of a shaft 14 which is rotatably mounted in frame members 15 and 16. The shaft 14 has an extension 14a to which driving means (not shown) is attached.

The transfer wheel means of this invention is indicated generally at 17. A preferred form comprises a plurality of generally circular blades 18 assembled tightly on a shaft 19 with a suitable spacer means 20 between adjacent blades and all held tightly assembled between the nuts 21. It will be noted that the blades 18 have radially outwardly extending points at their periphery with alternate blades having their points staggered as indicated in FIG. 1 at 18a and 18b. It will be noted in FIG. 1 that the pointed ends of the blades 18 terminate in a generally circumferential zones and the wheel means 17 is mounted adjacent the pulley means 13 at the discharge end of the conveyor belt 12 so that the highest point of the travel zone of the ends of the pointed blades is not substantially higher than tangent with the top level of the conveyor belt 12. It results from this arrangement that the points of the blades 18 penetrate the food article very slightly as indicated at 18c where the food article 10 passes over the transfer wheel means.

The shaft 19 has an extension 19a by which to rotate the transfer wheel means. In FIG. 2, there has been indicated a sprocket 22 rotatable with shaft 14 and a sprocket 23 rotatable with shaft 19. These are connected by a belt or chain drive 24 and the diameters of the sprockets 22 and 23 are so chosen that the pointed ends of the blades 18 travel at approximately the same rate of speed as the conveyor belt 12. This results in a minor disturbance of the batter-coating 11 as the food article moves from the discharge end of the conveyor belt over the transfer wheel means.

When the food article reaches approximately the position of the right-hand article in FIG. 1, it is free to fall by gravity into a container 25 or any other mechanism for further processing of the article 10. This invention is intended for use with a bath of hot fat in the container 25 for the purpose of cooking the batter-coating 11 when the article has fallen from the transfer wheel means into the container 25.

Scraper means is utilized to keep the blades 18 relatively clean. For this purpose, a scraper or stripper plate 26 is provided having ears 26a at its opposite ends secured by bolts 27 to frame member 15. This stripper plate has a downturned flange 28 at its rear edge for leading the stripped material into a drip pan 29. The stripper plate has a plurality of fingers 30 extending forwardly alongside of and closely adjacent the opposite sides of every one of the blades 18 so as to scape loose batter material or the like from the blades as they rotate clockwise in the direction of the broken arrow indicated in FIG. 1.

It results from this invention that a food product article 10 coated with a coating such as the thick batter 11 is transferred from the horizontal conveyor belt run 12 over the transfer wheel means 17 with a very slight penetration of the batter coating by the pointed ends of the blades 18 and then as the article is discharged at the right-hand end of FIGS. 1 and 2, the batter coating 11 will refill any coating area disturbed by contact with the pointed ends of the blades 18 before the article hits the hot fat cooking bath in the container 25. It is believed, therefore, that this invention provides a new method and apparatus for transferring a coated food article from a generally horizontal run to a vertical drop with a minimum disturbance of the coating of the food article.

In FIGS. 3 and 4, there is shown a second embodiment which is useful where the batter coating has been disturbed on the underside of the coated food article as it travels along the first conveyor. The second embodiment permits the disturbed batter coating on the bottom of the coated food article as it moves along the first conveyor to re-arrange itself before dropping into the hot fat by turning over the coated produce as it leaves the first conveyor and transporting it a short distance on a second conveyor with the original bottom surface turned upwardly.

Referring to FIGS. 3 and 4, an endless conveyor belt 31, preferably of open mesh wire construction, is suitably mounted in a frame 32 for travel of the upper or discharge run in the direction of the arrow in FIG. 3. Of the frame, only the parallel side members 32a and 32b are shown separated by a rigid spacer member 33 as that is all which is necessary to understand the present invention. Near the discharge end the conveyor belt passes over an idler pulley 34 and then over a combined drive pulley and pointed wheel means 35 as clearly shown in FIG. 3. Both the members 34 and 35 are journaled in the side frame members 32a and 32b. The structure of the member 35 comprises a central shaft upon which a plurality of generally circular blades 36 are assembled tightly with suitable spacer means 37 between adjacent blades. Each blade 36 provides a plurality of pointed members 36a at its periphery. It will be noted in FIG. 3 that the pointed ends of the members 36a lie in a circle which is substantially tangent to the upper run of the conveyor belt 31 as mentioned in the first described form of this invention. Preferably, the pointed members 36a of the various blades 36 are assembled in staggered relationship along the shaft 35 in the same manner as in the first embodiment described in connection with FIG. 1.

Beneath the parts 31, 35 and 36 which perform functions similar to those described in connection with FIG. 1, there is provided in this embodiment a conveyor means 38 spaced below the wheel means or blade means 36 sufficiently to permit a batter coated article 39 falling from the wheel means 36 to turn over and present upwardly that side B of the article which was previously in contact with the conveyor belt 31. The upper surface of the article in the original position has been marked A. The purpose of this operation is to permit the surface B of the coated article to smooth itself out by permitting the batter to flow into those spaces which were disturbed by travel along belt 31 and over the pointed blades 36. At the same time, it is desirable that the surface A which is presented downwardly in the final position seen at the lower right-hand end of FIG. 3 be not greatly disturbed in the final run along the conveyor means 38. To this end, the conveyor means is made rather short, preferably not more than two lengths of the article being transported, and its upper article carrying surface provides a plurality of point contacts across which the article 39 moves.

In FIGS. 3 and 4, this conveyor 38 is shown as comprising three shafts 40, 41 and 42 journaled in supplementary frame members carried by parallel subframe members 43a and 43b which in turn are adjustably mounted on bracket plates 44a and 44b which are rigidly secured respectively to the main frame members 32a and 32b by bolts 45. Rigid spacer members 46 are rigidly secured between members 43a and 43b by screws 47. Subframe members 43a and 43b are secured to their corresponding brackets 44a and 44b by bolts 48. Adjustability of the conveyor means 38 vertically is provided by means of the vertically extending slots 49 in the brackets 44a and 44b; and horizontal adjustability is provided by means of the horizontally extending slots 50 in the frame members 43a and 43b. To provide sufficient bearing length for shafts 40, 41 and 42, bearing plates 51 are rigidly secured to the outer faces of the frame members 43a and 43b, as by welding.

On each of the shafts 40, 41 and 42, a plurality of rotatable generally circular blades 52 are provided, the blades on each shaft being rigidly assembled with suitable spacers 53 between them. As shown in FIG. 4, it is preferred to have the blades attached to shaft 41 interleaved between the blades attached to those on shafts 40 and 42.

The drive for conveyor means 38 in this case is arranged dependent upon the drive of shaft 35. As previously mentioned, the open mesh wire conveyor belt 31 passes around shaft 35, the openings in the belt permitting it to pass over the pointed ends 36. On one end of shaft 35, sprocket 54 is fixed. Drive chain 55 connects with sprocket 56 which is secured on shaft 40. Sprocket 57 fixed on shaft 40 and sprocket 58 fixed on shaft 41 are drivingly connected by chain 59. On the opposite end of shaft 41 sprocket 60 is connected by chain 61 to sprocket 62 on shaft 42. This drives shafts 41 and 42 in the direction of the arrows of FIG. 3 so as to carry each food article 39 to the right-hand end of conveyor means 38 where it is dropped off to fall into the container 63 containing hot fat for cooking the batter-coated food article 39.

In this second embodiment the batter coating is given a better chance to re-arrange itself smoothly after the article is flipped upside down as shown in FIG. 3, followed by a short travel along conveyor means 38.

The distance from wheel means 36 to conveyor means 38 will vary with the length of article 39. Usually the fall will be between once or twice the length of article 39, adjustable at 48, 49 as previously described.

What is claimed is:

1. Coated food handling apparatus comprising an open-mesh conveyor belt having a discharge end, pulley means at said discharge end over which the discharge run of said conveyor belt passes, transfer wheel means having a plurality of pointed members extending outwardly and terminating in a generally circumferential zone, means mounting said wheel means adjacent said pulley means so that said pointed members terminate in a zone whose highest level is not substantially higher than a position tangent with the top level of said discharge run of said conveyor belt where it passes over said pulley, and means for driving the peripheral ends of said wheel means pointed members at a rate of speed sufficiently approximating the speed of said conveyor that the batter coating of a food article is not greatly disturbed, whereby a coated food article may be taken from said conveyor belt and transferred by said wheel means for a change in direction with a coating of said article disturbed only by contact with said pointed members.

2. Apparatus as defined in claim 1 wherein coated food processing equipment is positioned vertically directly below said wheel means and there is a clear space provided between the article discharge zone of said wheel means and said equipment, whereby said coated article falls by gravity into said equipment.

3. Apparatus as defined in claim 2 wherein said food coating is batter, and said processing equipment is a hot-fat container, whereby said batter while falling toward said container refills any coating area disturbed by contact with said pointed members and said restored batter coating is cooked by the hot fat in said container.

4. Apparatus as defined in claim 1, including conveyor means in position to receive an article falling from said wheel means, and said conveyor means being spaced below said wheel means sufficiently to permit an article falling from said wheel means to turn over and present upwardly that side of the article previously in contact with said conveyor belt.

5. Apparatus as defined in claim 4 wherein said conveyor means has an upper article carrying surface which is substantially horizontal and which provides a plurality of point contacts with the article carried.

6. Apparatus as defined in claim 5 wherein said conveyor means transports an article a short distance not substantially greater than two lengths of the article transported.

References Cited

UNITED STATES PATENTS

| | | | |
|---|---|---|---|
| 2,239,665 | 4/1941 | Straeten | 198—103 X |
| 2,527,687 | 10/1950 | Stock | 99—407 |
| 3,071,235 | 1/1963 | Randall | 198—103 X |

ROBERT W. JENKINS, *Primary Examiner.*

U.S. Cl. X.R.

99—409